(12) United States Patent
Kim et al.

(10) Patent No.: US 12,512,545 B2
(45) Date of Patent: Dec. 30, 2025

(54) MOUNTING STRUCTURE FOR BATTERY PACK

(71) Applicants: Hyundai Motor Company, Seoul (KR); Kia Corporation, Seoul (KR)

(72) Inventors: Kyung Mo Kim, Gyeonggi-do (KR); Ho Kyun Ju, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 71 days.

(21) Appl. No.: 17/381,696

(22) Filed: Jul. 21, 2021

(65) Prior Publication Data

US 2022/0149469 A1    May 12, 2022

(30) Foreign Application Priority Data

Nov. 11, 2020    (KR) .................. 10-2020-0150168

(51) Int. Cl.
*H01M 50/244* (2021.01)
*B60K 1/00* (2006.01)
*B60K 1/04* (2019.01)
*H01M 10/613* (2014.01)
*H01M 10/625* (2014.01)
(Continued)

(52) U.S. Cl.
CPC ............ *H01M 50/244* (2021.01); *B60K 1/04* (2013.01); *H01M 10/613* (2015.04); *H01M 10/625* (2015.04); *H01M 10/6556* (2015.04); *H01M 10/6568* (2015.04); *H01M 50/209* (2021.01); *H01M 50/249* (2021.01);
(Continued)

(58) Field of Classification Search
CPC ............ H01M 50/244; H01M 50/209; H01M 50/249; H01M 10/613; H01M 10/625; H01M 10/6556; H01M 10/6568; H01M 10/6567; B60L 58/26; B60L 50/64; B60L 50/20; B60K 1/04; B60K 2001/005; B60K 2001/0438
See application file for complete search history.

(56) References Cited

U.S. PATENT DOCUMENTS

2011/0318625 A1    12/2011    Yajima et al.
2012/0160583 A1    6/2012    Rawlinson
(Continued)

FOREIGN PATENT DOCUMENTS

CN    108232358 A    6/2018
CN    110854320 A    2/2020
(Continued)

OTHER PUBLICATIONS

English translation of CN-210956796-U (Year: 2020).*

*Primary Examiner* — Jonathan G Leong
*Assistant Examiner* — Drew C Newman
(74) *Attorney, Agent, or Firm* — Fox Rothschild LLP (57) ABSTRACT

A mounting structure for a battery pack is provided. The mounting structure includes a battery pack having a plurality of battery modules, a carrier, which is positioned at the battery pack to be partitioned and to allow the battery modules to be mounted therein. A seating portion is formed in a vehicle body to define a pace for accommodating the battery pack therein. A lower cover is positioned on a lower surface of the battery pack, and a heat sink is coupled to the carrier to face lateral side surfaces of the battery modules and to define a flow path through which cooling water flows.

7 Claims, 6 Drawing Sheets

(51) Int. Cl.
  *H01M 10/6556* (2014.01)
  *H01M 10/6568* (2014.01)
  *H01M 50/209* (2021.01)
  *H01M 50/249* (2021.01)

(52) U.S. Cl.
  CPC ............... *B60K 2001/005* (2013.01); *B60K 2001/0438* (2013.01); *H01M 2220/20* (2013.01)

(56) References Cited

U.S. PATENT DOCUMENTS

| | | | |
|---|---|---|---|
| 2018/0128375 A1* | 5/2018 | Miller | F16J 15/102 |
| 2019/0081298 A1 | 3/2019 | Matecki et al. | |
| 2020/0067156 A1* | 2/2020 | Chi | H01M 10/625 |
| 2020/0096260 A1* | 3/2020 | Omi | H01M 10/653 |
| 2020/0398652 A1* | 12/2020 | Stephens | B62D 25/025 |
| 2021/0146750 A1* | 5/2021 | Hardy | B60L 1/006 |

FOREIGN PATENT DOCUMENTS

| | | | |
|---|---|---|---|
| CN | 210956796 U | * | 7/2020 |
| JP | 4434213 B2 | | 3/2010 |
| JP | 5375079 B2 | | 12/2013 |
| KR | 101185720 B1 | | 9/2012 |
| KR | 2012-0116747 A | | 10/2012 |
| KR | 102065099 B1 | | 1/2020 |
| WO | 2017104383 A1 | | 6/2017 |
| WO | 2019/169080 A1 | | 9/2019 |

* cited by examiner

MOUNTING STRUCTURE FOR BATTERY PACK

CROSS-REFERENCE TO RELATED APPLICATION

This application claims under 35 U.S.C. § 119(a) the benefit of priority to Korean Patent Application No. 10-2020-0150168 filed on Nov. 11, 2020, the entire contents of which are incorporated herein by reference.

BACKGROUND

(a) Technical Field

The present disclosure relates to a mounting structure for a battery pack, and more particularly, to a mounting structure for a battery pack, which includes a seating portion formed in a vehicle body, in which a battery pack including a plurality of battery modules is positioned, and a lower cover, which surrounds the battery modules and is fixed to the vehicle body.

(b) Background Art

Generally, an electric vehicle travels by driving a motor using power charged in a battery without using fuel. Since the electric vehicle uses a battery as a power source instead of gasoline or diesel and consequently generates no pollution and low noise, global efforts are underway to commercialize electric vehicles. Additionally, since the battery provided in the electric vehicle has problems of limited capacity or size or the like, the battery includes a plurality of modules, each of which includes a plurality of battery cells.

A plurality of battery modules to be mounted in an electric vehicle are mounted in a battery pack, and a battery tray is mounted on the inner bottom of the vehicle. A conventional battery tray serves only as a simple tray, in which a plurality of batteries are mounted, and is incapable of realizing both stable mounting of the batteries and heat dissipation.

Accordingly, the necessity for a vehicular battery tray capable of implementing both stable mounting of a battery and heat dissipation is increased. Furthermore, in the case of a conventional battery pack seated on the upper surface of a vehicle, there is a problem in which the number of battery modules is limited since the ratio of the volume of the battery pack to the area of the upper surface of the vehicle is low.

The above information disclosed in this section is merely for enhancement of understanding of the background of the invention and therefore it may contain information that does not form the prior art that is already known in this country to a person of ordinary skill in the art.

SUMMARY

The present invention has been made in an effort to solve the above-described problems associated with the prior art. It is an object of the present invention to provide a mounting structure for a battery pack, which is constructed to include a seating portion formed in the lower surface of a vehicle body and a lower cover, which is fixed to the vehicle body in the state of being in contact with the lower surface of the battery pack to maximize the ratio of the volume of the battery modules to the area of the lower surface. It is another object of the present invention to provide a mounting structure for a battery pack, which is constructed to integrally fix the battery pack to a vehicle body by a seating portion integrally formed with the lower end of the vehicle body.

The objects of the present invention are not limited to the above-mentioned objects, and other objects of the present invention, which are not mentioned above, will be clearly understood from the following descriptions of preferred embodiments, and will be apparent from the exemplary embodiments of the present invention. The above objects and other objects of the present invention are achieved by the means and combinations thereof disclosed in the claims.

In one aspect, the present invention provides a mounting structure for a battery pack including a battery pack having a plurality of battery modules, a carrier, which is positioned at the battery pack to be partitioned and to allow the battery modules to be mounted therein, a seating portion formed in a vehicle body to define a pace for accommodating the battery pack therein, a lower cover positioned on a lower surface of the battery pack, and a heat sink coupled to the carrier to face lateral side surfaces of the battery modules and to define a flow path through which cooling water flows.

In an exemplary embodiment, the battery pack may include a mounting portion, which is fixed to the vehicle body through the lower cover and the seating portion. The mounting structure may further include a heat dissipation adhesive positioned between the carrier and the battery modules. The heat sink may include an inlet, through which cooling water is introduced, and an outlet, through which the cooling water, which has performed heat exchange, is discharged, the inlet and the outlet being formed in a same surface of the battery pack.

Additionally, the battery pack may include a plate, on upper and lower surfaces of which the battery modules are disposed. The heat sink may include a central flow path, and a portion of the carrier between the battery modules communicates with the central flow path. The seating portion may be formed in a lower surface of the vehicle body.

The mounting structure may further include an electric component unit disposed at at least one end of the battery pack. In addition, the mounting structure may include a sealing member disposed between the lower cover and the vehicle body. The carrier may be configured to have a form of an H-beam.

The carrier may have a flow path forming the flow path in the heat sink, and the flow path in the carrier may include an upper flow path, which is formed in an upper portion of the H-beam through which the cooling water is introduced, and a lower flow path, which is formed in a lower portion of the H-beam through which the cooling water is discharged. The mounting structure may further include a heat dissipation adhesive disposed between the carrier and the battery modules.

BRIEF DESCRIPTION OF THE DRAWINGS

The above and other features of the present invention will now be described in detail with reference to exemplary embodiments thereof, illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, the reference numbers refer to the same or equivalent parts of the present invention throughout the several figures of the drawing.

DETAILED DESCRIPTION

Hereinafter, exemplary embodiments of the present invention will be described in detail with reference to the accompanying drawings. The exemplary embodiments of the present invention may be modified into various forms, and the scope of the present invention should not be construed as being limited to the following exemplary embodiments. These exemplary embodiments are provided so that this disclosure will be thorough and complete, and will fully convey the scope of the disclosure to those skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about." The term "part", "unit" or "module" means a unit for performing at least one function or action, and may be realized by hardware or a combination of hardware. In the specification, the term "plate" refers to the bottom surface on which battery modules are seated between carriers, and may be understood to include all of horizontal flat surfaces of carriers each having the shape of an H-beam.

Hereinafter, embodiments of the present invention will be described in detail with reference to the accompanying drawings. In the description referring to the drawings, the same or equivalent components may be denoted by the same reference numbers, and a description thereof will not be repeated.

The present invention is directed to a mounting structure of a battery pack 100. Preferably, the mounting structure of the battery pack 100 according to the present invention may include the battery pack 100 having a plurality of battery modules 110, each of which includes a plurality of battery cells which are stacked vertically one on another, and a seating portion 210, which is formed in the rear surface of a vehicle body 200 and in which the battery pack 100 is mounted.

The battery pack 100 according to the present invention may include multiple rows of battery modules 110, which are symmetrically arranged in the same plane relative to the center of the battery pack 100 in the longitudinal direction. Furthermore, the battery modules may be disposed on and beneath the plate 500 of the battery pack 100.

Figure 1:
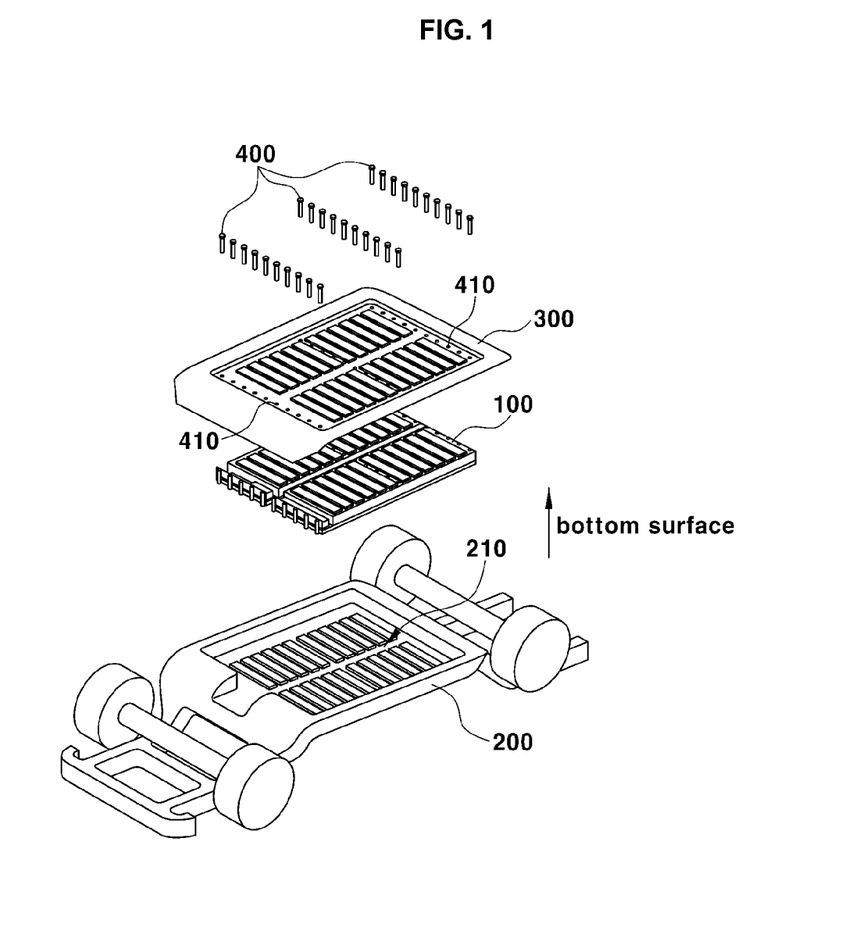
FIG. 1 is a perspective view of the mounting structure for the battery pack according to an exemplary embodiment of the present invention.

FIG. 1 is a perspective view of the mounting structure for the battery pack 100 according to an exemplary embodiment of the present invention. As illustrated in the drawing, the battery pack 100 may include the seating portion 210, which is positioned on the rear surface of the vehicle. At least a portion of the battery pack 100 in the vertical direction may be fitted into the seating portion 210, and a lower cover 300 may be coupled to one surface of the battery pack 100 to seal the battery pack 100.

The seating portion 210 may be integrally formed in the vehicle body 200, and may be depressed such that at least a portion of the battery pack 100 is fitted vertically thereinto. Preferably, the seating portion 210 may be provided on the bottom surface thereof with the same pattern as the upper surface of the battery pack 100 to serve as a tray for the battery pack 10. Accordingly, when the battery pack 100 is seated in the seating portion 210, the battery modules 110 may be at least partially fitted into the seating portion 210 having a predetermined pattern.

The battery pack 100 may include the plurality of battery modules 110, each of which includes a plurality of battery cells, which are stacked one on another in the height or vertical direction, and carriers 120, by which the battery modules 110 are arranged in multiple rows in the longitudinal direction. Preferably, the carriers 120 may be positioned on the upper and lower surfaces of the plate 500 of the battery pack 100 to fit the battery modules 110 between the carriers 120.

According to an exemplary embodiment of the present invention, the battery modules 110, which are positioned in the battery pack 100 mounted on the vehicle body 200, may be arranged in a 2×N matrix pattern, and may be positioned on the upper and lower surface of the plate 500. A heat sink 130 may be disposed to face the lateral side surfaces of the battery modules 110, and may have a central flow path 600, which is positioned at the center of the battery pack 100 in the longitudinal direction. The central flow path 600 may include an upper flow path 121 and a lower flow path 122, which are disposed to face the lateral side surfaces of the battery modules 110 between which the carriers 120 are disposed, thereby causing the cooling water introduced from the vehicle to flow close to the battery modules 110. Preferably, the central flow path 600, which communicates with a cooling water inlet, may be connected to the upper flow path 121 in the carrier 120, and the cooling water discharged from the lower flow path 122 in the carrier 120 may be passed to another central flow path 600 communicating with an outlet.

The heat sinks 130 may be positioned on and beneath of the plate 500 to correspond to the lateral side surfaces of the battery modules 110. Preferably, the flow paths formed in the carriers 120 may be positioned to correspond to the respective battery modules 110. Each of the carriers 120 may be formed to have a shape of an H-beam, and the flow path formed in the carrier 120 may be formed to have the shape of an H-beam may be divided into upper and lower flow paths. The upper flow path 121 formed in the upper portion of the carrier 120 having the shape of an H-beam may cause the cooling water introduced through the central flow path 600 positioned at the center of the battery pack 100, to flow to the carrier 120. Meanwhile, the lower flow path 122 formed in the lower portion of the carrier 120 having the shape of an H-beam may cause the cooling water introduced into the upper end of the carrier 120, to be discharged through the central flow path 600. Accordingly, the cooling water that is introduced into the carrier 120, may be introduced into the upper flow path 121 formed in the upper portion of the carrier 120 to perform heat exchange with the battery modules 110, and may then be introduced into the central flow path 600 through the lower flow path 122.

The upper flow path 121 and the lower flow path 122, which are formed in the carrier 120, may be connected to each other at the ends of the battery modules 110 to allow a fluid to flow therethrough to allow the cooling water in the upper flow path to flow freely to the lower flow path 122. Preferably, the upper flow path 121 may be inclined downwards moving toward the end from the center of the battery pack 100 in a width direction, and the lower flow path 122 may be inclined downwards moving toward the center from the end of the battery pack 100 in the width direction.

The heat sink 130 may be constructed to dispose the carriers 120 between the battery modules 110 and such that the battery modules 110 perform heat exchange through the upper flow path 121 and the lower flow path 122 formed in the carriers 120. Preferably, the cooling water, which is introduced from a cooling water reservoir positioned in the vehicle, may flow to the battery pack 100 through the inlet positioned in one end of the battery pack 100, and may be discharged to the cooling water reservoir through the outlet positioned in the end adjacent to the inlet.

The central flow path 600, which is connected to the inlet in a fluid communication manner, and the central flow path 600, which is connected to the outlet in a fluid communication manner, may be composed of the same flow path or of different flow paths that are isolated from each other. The battery pack 100 may be fastened to the vehicle body 200 in the state in which one surface of the battery pack 100 is in contact with the lower cover 300 of the vehicle. Preferably, the lower cover 300 of the vehicle may be configured to surround the rear surface of the vehicle, and may include a sealing member adapted to hold the battery pack 100 between the vehicle body 200 and the lower cover 300.

The lower cover 300 has fixing apertures 410 formed at positions corresponding to mounting portions 140, and fixing pins 400, which are fixed to the vehicle body 200 through the fixing apertures 410 and the mounting portions 140. Accordingly, the vehicle body 200, the battery pack 100 and the lower cover 300 may be fixed integrally to one another.

Figure 2:
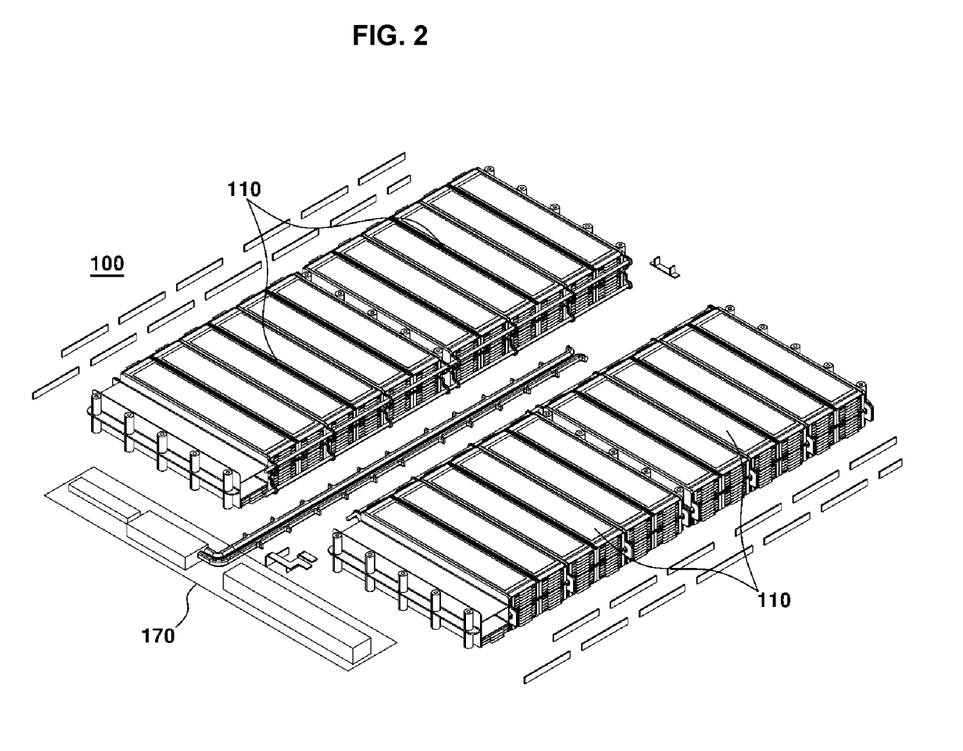
FIG. 2 is a perspective view of the battery pack according to an exemplary embodiment of the present invention.
Figure 3:
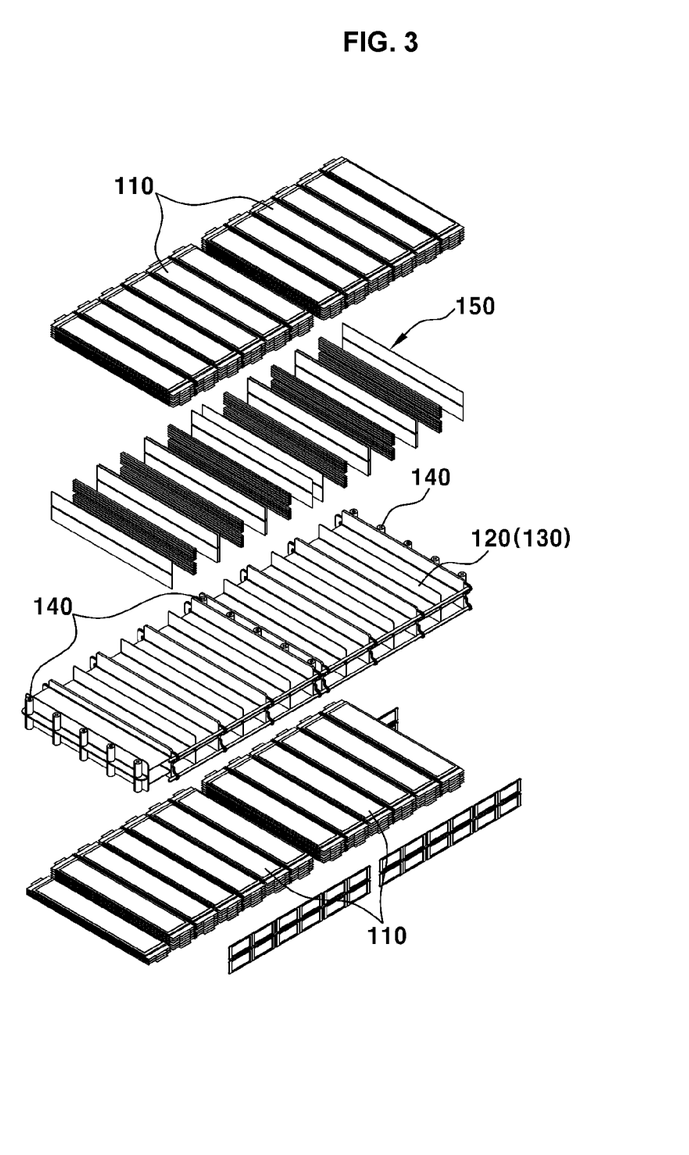
FIG. 3 is an exploded perspective view of the battery pack according to an exemplary embodiment of the present invention.

FIG. 2 is a perspective view of the battery pack 100 according to an exemplary embodiment of the present invention. FIG. 3 is an exploded perspective view of the battery pack 100. The battery pack 100 may include the plate 500 including battery modules 110, and the carriers 120, which are disposed between the battery modules 110 and extend perpendicularly to the plate 500. Each of the carriers 120 may include the upper flow path 121 and the lower flow path 122, which are connected to each other in a fluid communication manner to allow the cooling water in the vehicle to flow in the longitudinal direction of the battery modules 110.

According to an exemplary embodiment of the present invention, the battery modules 110 may be positioned on and beneath the plate 500, and twelve battery modules 110 may be provided in the carriers 120. The battery pack 100 may include two rows of battery modules 110. The battery pack 100 may be provided at one end thereof with an electric component unit 170, and a low-voltage wiring harness may be disposed between the electric component unit 170 and the battery modules 110 to electrically connect the electric component unit 170 to the battery modules 110. The electric component unit 170 may be fixed to one end of the battery pack 100 in the longitudinal direction, and may be disposed in at least one of two rows of carriers 120, in which no battery module 110 is provided. According to an exemplary embodiment of the present invention, the electric component unit 170 may include a battery management system (BMS), a power relay assembly, a fuse and the like.

Additionally, bus bars may be coupled to two lateral sides of the battery modules 110 via laser welding, and sensing blocks may be positioned outside the bus bars or ends of the battery modules 110 adjacent to the bus bars. The battery modules 110 may be positioned between carriers 120 that are arranged adjacent to each other. Heat dissipation adhesive 150 may be positioned between the inner surfaces of the carriers 120 and the battery modules 110. Accordingly, since the carriers 120 and the battery modules 110 exchange heat with each other via the heat dissipation adhesive 150, the efficiency of heat conduction is improved.

The heat dissipation adhesive 150, which is in a semisolid state, may be applied to the bottom surfaces and the lateral side surfaces of the carriers 120 to fix the battery cells forming the battery modules 110 to the carriers 120. According to an exemplary embodiment of the present invention, the heat dissipation adhesive 150 may be composed of two-pack resin, and may include alumina as the main material, which is heat conductive material, and a hardening agent.

The process of applying the heat dissipation adhesive 150 and then stacking the battery modules 110 may be performed such that the heat dissipation adhesive 150 is applied to the inner surfaces of the carriers 120 and the battery cells are stacked obliquely or horizontally. Alternatively, the process may be performed such that the heat dissipation adhesive is applied to the inner surfaces of the carriers 120, guide film is provided to the heat dissipation adhesive, the battery cells forming the battery modules 110 are arranged on the heat dissipation adhesive, and the guide film is removed.

The exposed surfaces of the battery modules 110 stacked in the carriers 120 may be provided with pads for absorbing the reactive force due to cell swelling. At least one of the battery modules 110, which are exposed to upper and lower surfaces of the plate 500 of the battery pack 100, may be provided with the pads.

The mounting portions 140 may be positioned at two ends of the battery pack 100. Preferably, the mounting portions 140 may be positioned between the battery modules 110. The mounting portions 140 may be formed at positions corresponding to the fixing apertures 410 formed in the lower cover 300 of the vehicle. Each of the mounting portions 140 may have a hole therein. That is, the hole may be formed through each of the upper and lower ends of each mounting portion 140. Accordingly, after the battery pack 100 is seated on the vehicle body 200, the fixing apertures 410 in the lower cover 300 may be moved to positions corresponding to the mounting portions 140, and the fixing pins 400 may be fastened to the vehicle body 200, thereby integrally coupling the lower cover 300, the battery pack 100 and the vehicle body 20 to one another.

Figure 4:
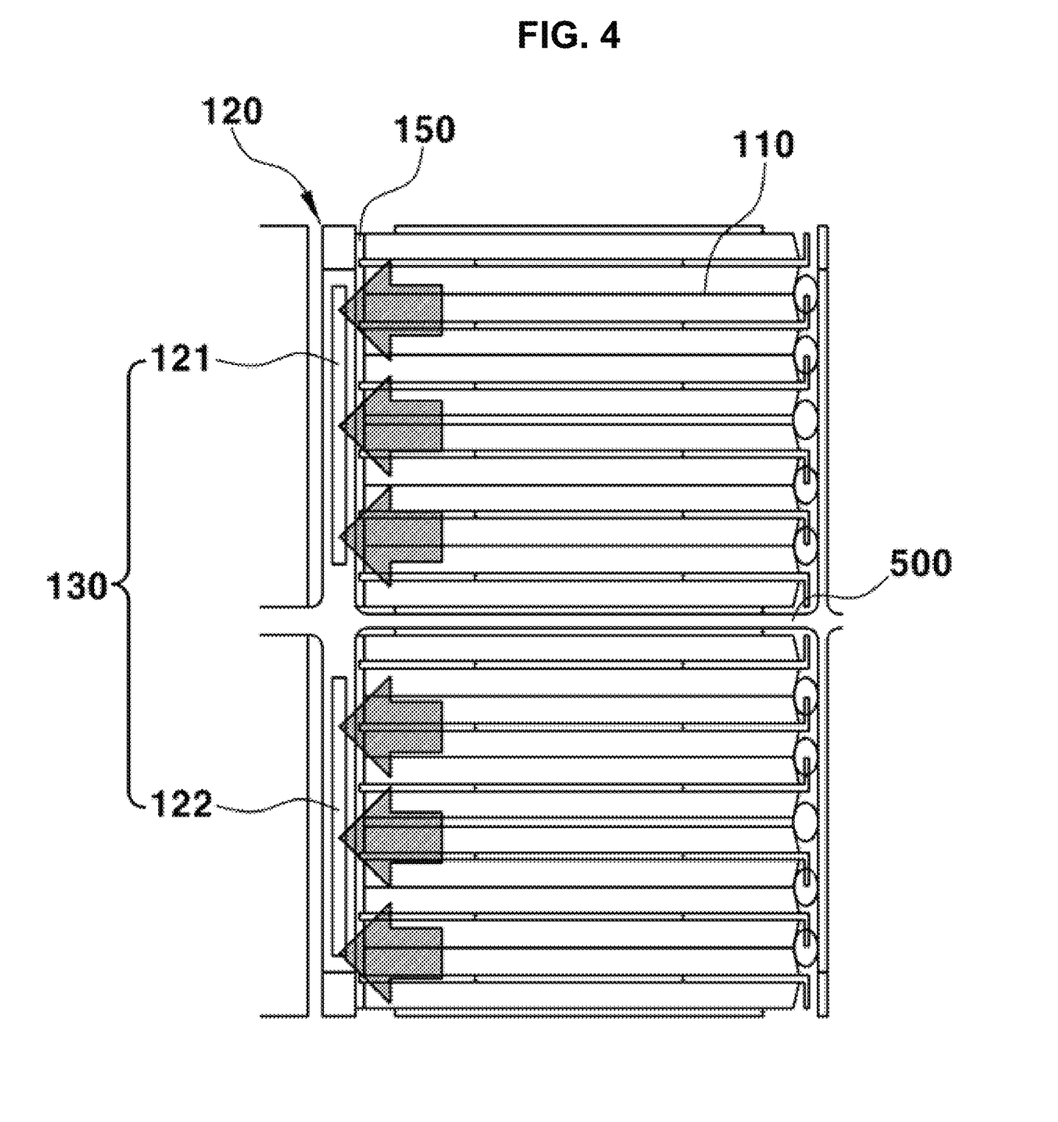
FIG. 4 is a side cross-sectional view of carriers of the mounting structure for a battery pack according to an exemplary embodiment of the present invention.
Figure 5:
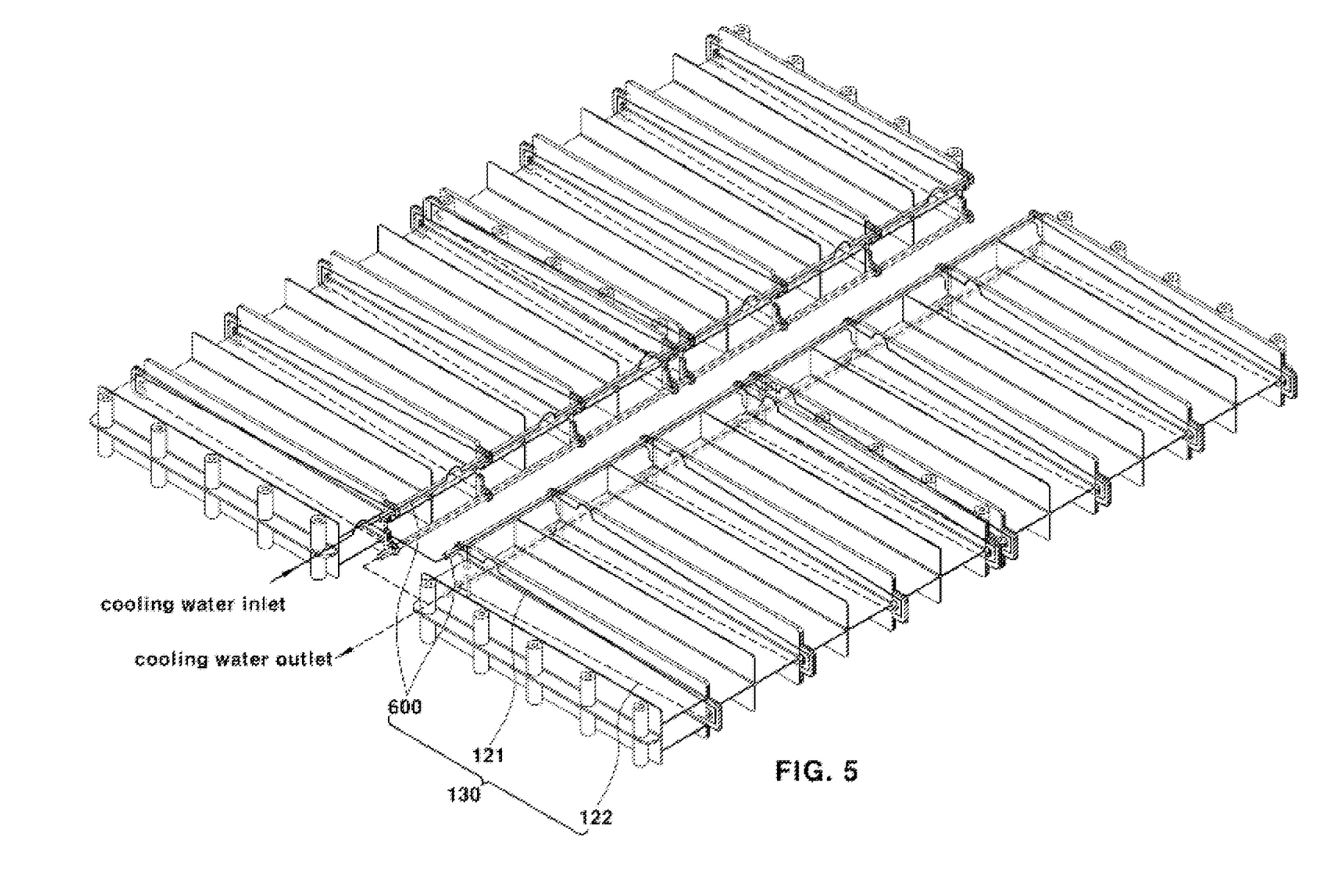
FIG. 5 is a view illustrating a flow path for cooling water in the mounting structure for a battery pack according to an exemplary embodiment of the present invention.

FIG. 4 is a side cross-sectional view of the carriers 120 constituting the heat sink 130 according to an exemplary embodiment of the present invention. FIG. 5 is a view illustrating flow of cooling water flowing through the carriers 120. Each of the carriers 120 may be configured to have the shape of an H-beam, and may have therein the upper flow path 121 and the lower flow path 122.

The upper flow path 121 in the carrier 120 may be positioned on the plate 500 in the vertical direction, and the lower flow path 122 may be positioned beneath the plate 500 in the vertical direction. The upper flow path 121 may be connected to the central flow path 600 at the center of the battery pack 100 and to the inlet, which is positioned at one end of the battery pack 100 and through which the cooling water is introduced, and the lower flow path 122 may be connected to the outlet positioned adjacent to the inlet.

The upper flow path 121 and the lower flow path 122 may be connected to each other in a fluid communication manner at the end of the carrier 120 that is far away from the center of the battery pack 100. The upper flow path 121 and the lower flow path 122 may be connected to each other in a fluid communication through the upper and lower open ends of the carrier 120. In other words, the cooling water introduced through the inlet, flows into the upper flow path 121 through the central flow path 600, and the cooling water in the upper flow path 121 flows into the lower flow path 122 due to gravity or fluid pressure, and is discharged through another central flow path connected to the lower flow path 122.

As illustrated in FIG. 5, the cooling water that is introduced through the inlet, flows in the longitudinal direction of the battery pack 100 through the central flow path 600 in the center of the battery pack 100, and flows into the upper flow path 121 in the carrier 120, which faces the battery module 110. The cooling water that is introduced into the upper flow path 121, flows into the lower flow path 122 at the end of the carrier 120, and is discharged from the outlet through the lower flow path 122 and the central flow path 600 of the battery pack 100. The carriers 120 according to the exemplary embodiment of the present invention hold the individual battery modules 110 and provide the rigidity of the battery pack 100 in a width direction, and may include the flow paths forming the heat sink 130.

Figure 6:
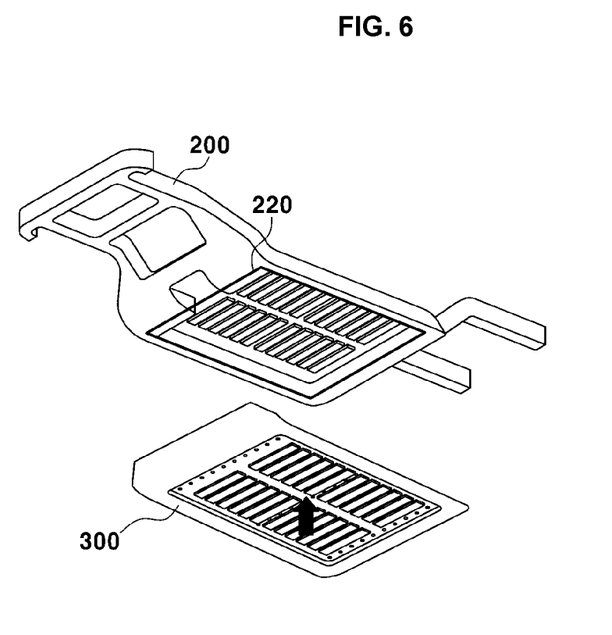
FIG. 6 is a perspective view of the coupling structure of the lower cover according to an exemplary embodiment of the present invention.

FIG. 6 is a view illustrating the construction of the lower cover 300 according to the exemplary embodiment of the present invention, which is coupled to the vehicle body 200. As illustrated in the drawing, the seating portion 210 may be formed in the lower surface of the vehicle body 200, and the lower cover 300 may be coupled to the lower surface of the vehicle body 200 to surround the seating portion 210.

The lower cover 300 may be positioned to fully surround the periphery of the battery pack 100 and to surround at least a portion of the lower surface of the vehicle body 200. The lower cover 300 may include a sealing member 220 for anti-vibration and waterproofing between the lower cover 300 and the vehicle body 200. Preferably, to couple the lower cover 300 to the vehicle body 200, the battery pack 100 may be first seated on the upper surface of the lower cover 300, and the lower cover 300 including the battery pack 100 may be integrally coupled to the vehicle body 200.

The lower cover 300 may include a pattern corresponding to the lower surface of the battery pack 100, and the battery pack 100 may be positioned on the upper surface of the lower cover 300 such that the fixing apertures 410 correspond to the mounting portions 140. Specifically, to fix the battery pack 100 to the vehicle body 200, the battery pack 100 may be fixed to the lower cover 300, and the lower cover 300 including the battery pack 100 fixed thereto may be integrally coupled to the vehicle body 200. At this time, the fixing pins 400 may be inserted into the fixing apertures 410 in the lower cover 300, thereby integrally coupling the vehicle body 200, the battery pack 100 and the lower cover 300 to each other.

By virtue of the above-described constructions of the exemplary embodiments and combinations thereof, the present invention offers the following effects. The mounting structure for a battery pack according to the exemplary embodiment of the present invention is able to mount the battery pack to a vehicle body in a high ratio of the volume of the battery pack to the area of the vehicle body. Furthermore, the mounting structure for a battery pack according to the exemplary embodiment of the present invention is able for the battery pack to be mounted on the lower surface of the vehicle body, thereby making the assembly process convenient.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A mounting structure for a battery pack, comprising:
a battery pack including a plurality of battery modules;
a plurality of carriers, formed as H-shaped beams, and positioned adjacent each other to allow the plurality of battery modules to be mounted to a respective upper side or lower side of the H-shaped beams and to fit each of the plurality of battery modules between respective carriers of the plurality of carriers;
wherein the plurality of carriers includes a plate forming a horizontal flat surface of the H-shaped beams,
wherein a first portion of the plurality of battery modules are disposed on an upper surface of the plate of the H-shaped beams and a second portion of the plurality of battery modules are disposed on a lower surface of the plate of the H-shaped beams;

a seating portion formed in a vehicle body to define a space for accommodating the battery pack therein;

a lower cover positioned on a lower surface of the battery pack; and a heat sink coupled to the plurality of carriers to face lateral side surfaces of the plurality of battery modules and to define a flow path through which cooling water flows, wherein the flow path includes:

a central flow path positioned at the center of the battery pack in the longitudinal direction and including a first central flow path and a second central flow path, wherein the first central flow path is in communication with an inlet through which the cooling water is introduced to the flow path and the second central flow path is in communication with an outlet through which the cooling water is discharged from the flow path;

an upper flow path that is formed in an upper portion of the H-shaped beams, and branches from the first central flow path such that cooling water introduced at the inlet flows into the upper flow path through the first central flow path; and a lower flow path that is formed in a lower portion of the H-shaped beams, branches from the second central flow path, and is connected to the upper flow path such that cooling water in the upper flow path flows into the lower flow path and is discharged through the second central flow path;

wherein the upper flow path is positioned adjacent to the first portion of the plurality of battery modules that are mounted on the upper surface of the plate of the H-shaped beams; and wherein the lower flow path is positioned adjacent to the second portion of the plurality of battery modules that are mounted on the lower surface of the place of the H-shaped beams.

2. The mounting structure for a battery pack of claim 1, wherein the battery pack includes a mounting portion, which is fixed to the vehicle body through the lower cover and the seating portion.

3. The mounting structure for a battery pack of claim 1, further comprising a heat dissipation adhesive positioned between the plurality of carriers and the plurality of battery modules.

4. The mounting structure for a battery pack of claim 1, wherein the inlet and the outlet are formed in a same surface of the battery pack.

5. The mounting structure for a battery pack of claim 1, wherein the seating portion is formed in a lower surface of the vehicle body.

6. The mounting structure for a battery pack of claim 1, further comprising an electric component unit disposed on at least one end of the battery pack.

7. The mounting structure for a battery pack of claim 1, further comprising a sealing member disposed between the lower cover and the vehicle body.

* * * * *